J. M. McDONALD.
Truss-Bridge.

No. 8,280. Reissued June 11, 1878.

WITNESSES:
Chas. Nida
C. Sedgwick

INVENTOR:
J. M. McDonald
BY Munn & Co
ATTORNEYS.

N. PETERS, PHOTO-LITHOGRAPHER, WASHINGTON, D. C.

UNITED STATES PATENT OFFICE.

JOSEPH M. McDONALD, OF TOMLINSON, ARKANSAS.

IMPROVEMENT IN TRUSS-BRIDGES.

Specification forming part of Letters Patent No. 173,863, dated February 22, 1876; Reissue No. 8,280, dated June 11, 1878; application filed March 1, 1878.

*To all whom it may concern:*

Figure 1:
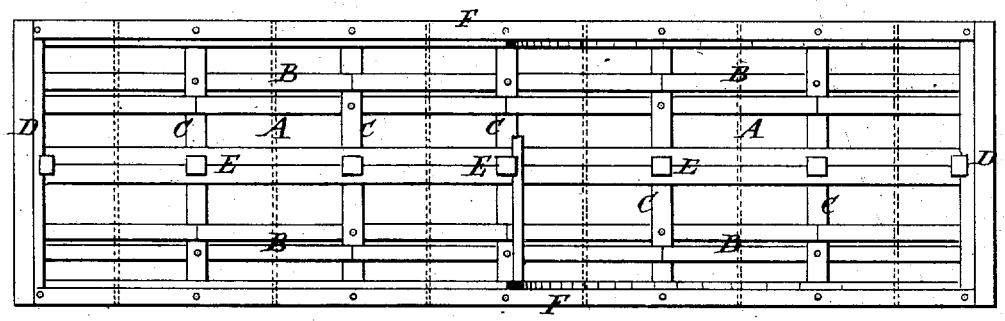
Figure 2:
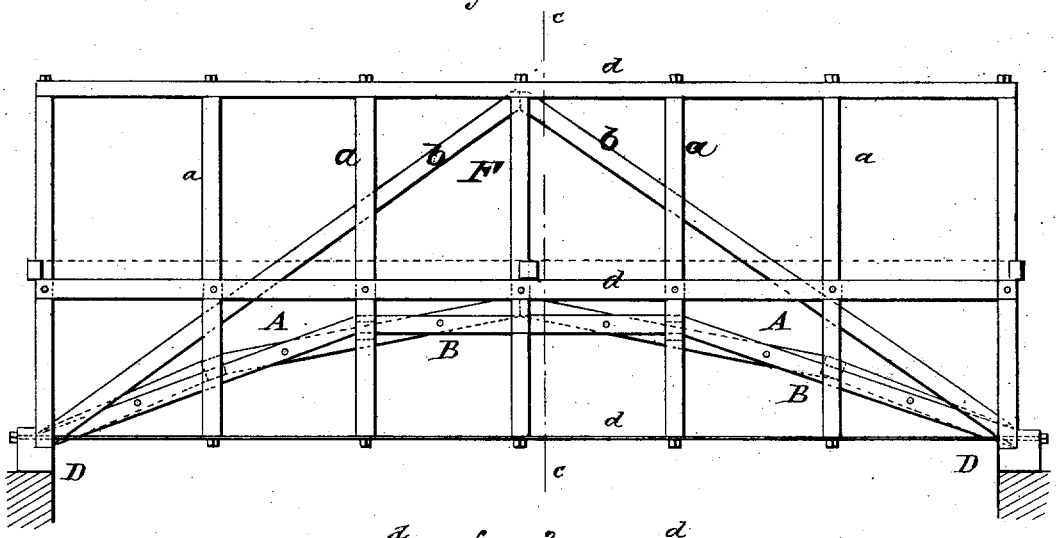
Figure 3:
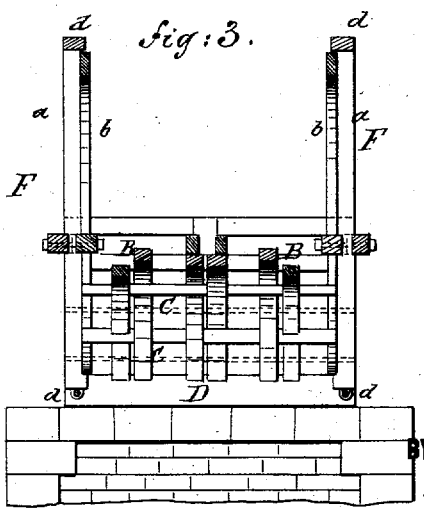

Be it known that I, JOSEPH M. McDONALD, of Tomlinson, in the county of Scott and State of Arkansas, have invented a new and Improved Truss-Bridge, of which the following is a specification:

In the accompanying drawings, Figure 1 represents a plan view, Fig. 2 a side elevation, and Fig. 3 a vertical transverse section, of my improved bridge on the line *c c*, Fig. 2.

Similar letters of reference indicate corresponding parts.

The invention relates to an improved bridge construction for large and small spans, to be made of wood or iron.

The invention consists mainly of an arch, made of laterally braced and bolted pieces of alternately interlocking timber, in combination with other parts, as herein described.

In the drawing, A represents the central arched part of my improved bridge. The adjoining timbers B of each set or pair are so arranged that the joint of two pieces meeting end to end is midway between the joints of the laterally-adjoining pieces, so as to alternate therewith, and form, with the lateral cross-pieces C passing between the center of one piece and the joint of the adjoining pieces, a rigidly-interlocking arch of considerable strength, which, with suitable flooring, &c., may be employed as a separate bridge structure if desired.

The ends of the arch-timbers are seated into wooden or iron shoes D, secured to the abutments or piers, and the flooring or railing of the arch may be supported on posts E.

The arch-timbers may be doubled, trebled, &c., by placing one arch on the other for bridges with larger spans and increased strength.

The outer or main trusses F are made of a series of vertical posts, *a*, that are braced by the simple brace-pieces *b*, (shown in Fig. 2,) for smaller spans. The posts *a* are connected by top, intermediate, and bottom timbers *d*. The posts are made of sufficient height to allow, when inclosed, the passage of cars or wagons without obstruction.

The number and arrangement of braces may be increased according to the dimensions and span of the bridge.

The trusses F are attached to the central and terminal cross-pieces of the arch when the compound structure is to be used.

The upright posts of the trusses may be steadied by cross-ties at the top and bottom if additional stiffness is required.

The bridge forms thus, by the arch and truss connection, a compound structure of great strength, while each part may form a separate bridge construction if desired to be separately used for repairing either part, or for other purposes, without interruption of traffic, so as to furnish a simple, durable, and economical bridge construction.

Having thus described my invention, I claim as new and desire to secure by Letters Patent—

1. A bridge composed of a working arch made of timbers breaking joint and ranging in intersecting lines and interlocking transverse timbers and a system of trusses, said arch and system of trusses being connected and adapted to operate separately from each other, substantially as shown and described.

2. The combination, with a compound arch, constructed substantially as specified, of the supporting-shoes of the piers or abutments, as set forth.

JOSEPH M. McDONALD.

Witnesses:
CHAS. H. HAWTHORNE,
JAMES A. HAWTHORNE.